Jan. 25, 1949.  J. H. WIGGINS  2,460,054
TANK BOTTOMS EQUIPPED WITH IMPROVED MEANS FOR
TESTING SEAMS AND RECOVERING
LEAKAGE FROM SAME
Original Filed June 7, 1943   3 Sheets-Sheet 2

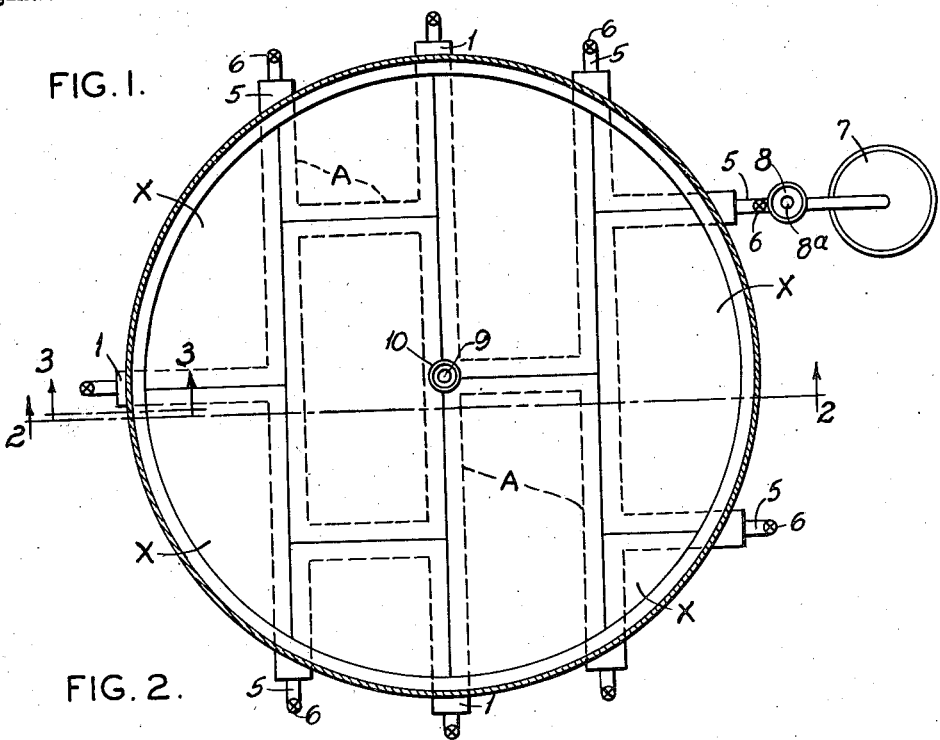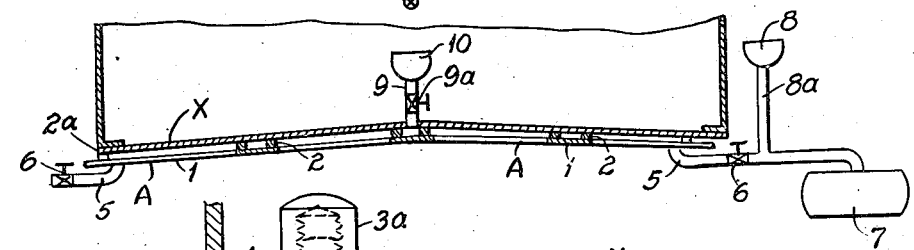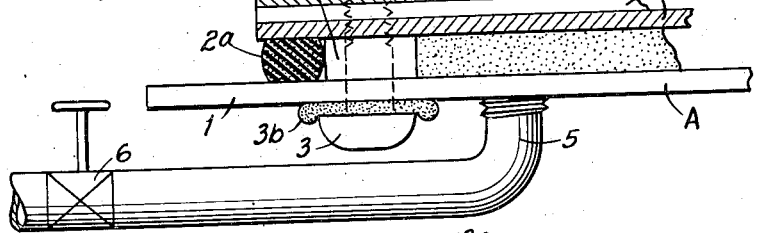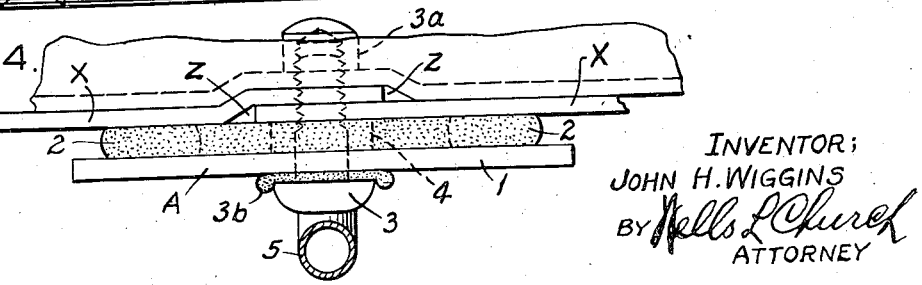
INVENTOR;
JOHN H. WIGGINS
ATTORNEY

INVENTOR;
JOHN H. WIGGINS
BY *Wells R. Church*
ATTORNEY

Jan. 25, 1949. J. H. WIGGINS 2,460,054
TANK BOTTOMS EQUIPPED WITH IMPROVED MEANS FOR
TESTING SEAMS AND RECOVERING
LEAKAGE FROM SAME
Original Filed June 7, 1943 3 Sheets-Sheet 3

INVENTOR;
JOHN H. WIGGINS
BY *Wells L. Church*
ATTORNEY

Patented Jan. 25, 1949

2,460,054

UNITED STATES PATENT OFFICE 2,460,054

TANK BOTTOMS EQUIPPED WITH IMPROVED MEANS FOR TESTING SEAMS AND RECOVERING LEAKAGE FROM SAME

John H. Wiggins, Chicago, Ill.

Continuation of application Serial No. 490,119, June 7, 1943. This application November 26, 1945, Serial No. 630,933

1 Claim. (Cl. 220—75)

This invention relates to tanks and containers of the kind that comprise a bottom made up of metal plates joined together by bolts, rivets or welding, my present application being a continuation of my pending application Serial No. 490,119, filed June 7, 1943, now abandoned.

In tanks of large size (often in excess of 100 ft. in diameter), the entire or major portion of the area of the tank bottom rests directly on the ground, and consequently, if a leak develops in the bottom of a storage tank of conventional construction while the tank is in service or filled with liquid, it is impossible to recover the leakage or even detect or approximately locate the defective seam in the tank bottom that has become leaky. Also in tank bottoms of conventional construction, there is no reliable or easy way of testing the seams or joints between the tank bottom plates, during the operation of connecting or joining said plates together. The result is that tremendous amounts of oil and gasoline are lost annually through leaks in the bottoms of storage tanks. In many instances, the leakage or seepage through defective seams of tank bottoms is so excessive, that it is considered sound practice to drill wells in ground that has become saturated with oil or gasoline that has escaped through defective joints in the bottoms of storage tanks over a period of years, so as to recover the oil or gasoline that has seeped through the ground to the first stratum of ground water, and thereafter, separate the oil from the mixture pumped out of the ground.

My invention has for one of its objects to provide a storage tank, equipped with a bottom constructed of metal plates that are joined together while they are disposed in the position, or the approximate position, they occupy in the finished structure, and which have combined with same troughs or trough spaces that are adapted to recover leakage or seepage from defective seams of the bottom, and also adapted to receive a medium that is applied to or exerted on the seams of the tank bottom to test or treat said seams.

Another object is to provide a metal tank bottom of novel construction, that can be quickly and reliably tested for leaks, either at the time of construction, or while the tank is in use.

Another object is to provide a tank having an upright side wall and a bottom that is built on the ground and equipped with troughs that will trap and convey to inspection or collection points located on the exterior of the tank at the periphery of the bottom, leakage that escapes through a defective joint or joints in the bottom of the tank; and Still another object of my invention is to provide a tank bottom that is easy to build, and of such design or construction that if any of the seams or joints of same are defective, the defects can be easily located.

Figure 1 of the drawings is a top plan view of a tank bottom constructed in accordance with my invention.

Figure 2 is a transverse sectional view of said bottom, taken on the line 2—2 of Figure 1, showing a portion of the side wall of the tank.

Figure 3 is an enlarged, fragmentary sectional view, taken on the line 3—3 of Figure 1.

Figure 4 is an enlarged, fragmentary side elevational view of the tank, as viewed from the left hand side of Figure 3.

Figure 5:
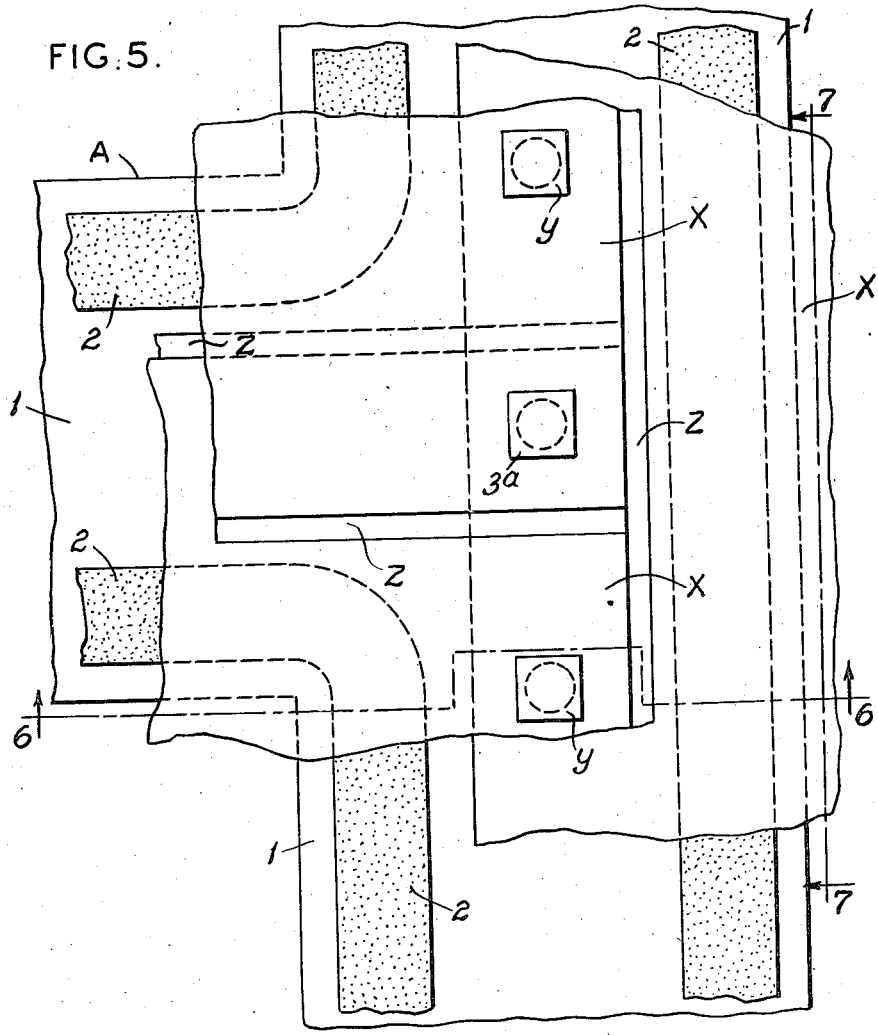
Figure 5 is an enlarged, fragmentary top plan view of the tank bottom, shown in Figure 1, illustrating the lapped tank bottom plates and the interconnected troughs on the underside of same.

Briefly described, my improved tank bottom consists of metal plates joined together by bolts, rivets or welding, and provided with a series of interconnected troughs that are adapted to trap and convey to one or more inspection points or one or more collecting receptacles, any substance or material that escapes from the tank through a leaky joint or joints in the bottom of the tank, said troughs also being adapted to be used as flow conduits for a medium employed to test said joints or to locate a leak in same, or used as suction conduits, in which a minus pressure can be created, either for the purpose of testing the joints for leaks, or to cause a sealing compound on the top side of the tank bottom to be drawn into the seams or joints of said bottom. The particular construction of said troughs and the way in which they are combined with the tank bottom, are immaterial, so far as my broad idea is concerned. Preferably, they are built into the tank bottom, or combined with same during the operation of joining or connecting together the metal plates that constitute the tank bottom, and they are of such construction or design that during the operation of building the bottom, and subsequently, testing the seams or joints of same, the tank bottom plates rest on the ground, or occupy the same position, or approximately the same position, they assume in the finished structure. As hereinafter explained, the troughs may consist of prefabricated members, preferably of substantially channel shape in cross section, disposed with the top edges of their side legs in contact with the underside of the tank bottom, or they may be formed from horizontal, or substantially horizontally-disposed, plates arranged in spaced relation with the underside of the tank bottom and sealed to same by resilient elements that constitute the side walls or side portions of the troughs. In the case of a tank bottom constructed of lapped plates, the troughs are preferably arranged so that the centers of the laps of the seams of the tank bottom are disposed over approximately the centers of the troughs. The troughs under the various seams or joints in the tank bottom are preferably connected with each other, so as to form a continuous or completely interconnected system, and in order to simplify the operation of producing tight joints between the troughs and the underside of the tank bottom, the troughs are so disposed with relation to the seams of said bottom, that the side portions of the troughs do not cross the laps of said seams. The troughs can slope either towards the center of the tank bottom, or towards the peripheral edge of said bottom, depending, of course, upon the grade or slope of the tank bottom. In instances where the tank bottom slopes downwardly from its center towards its peripheral edge, the trough system preferably comprises a plurality of inspection points located at the peripheral edge of the tank bottom, in spaced relation around the circumference of same, thereby making it possible to determine, within fairly close limits, the approximate location of a leak in the tank bottom. In the case of a tank bottom that slopes from its peripheral edge towards its center, the trough system will comprise a center discharge pipe buried in the ground and provided with a lateral branch that leads to an inspection point located at the peripheral edge of the tank bottom. In addition to the inspection point or points above referred to, the trough system may comprise one or more collection receptacles, into which the troughs discharge the substance or material that has leaked through a joint or joints of the tank bottom.

Figure 6:
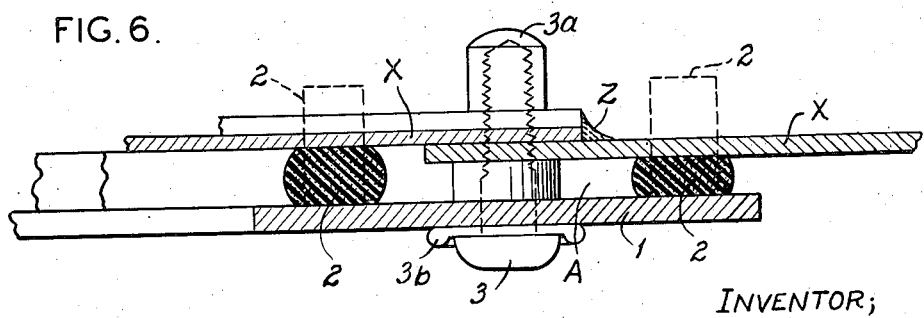
Figure 6 is a vertical sectional view, taken on the line 6—6 of Figure 5.
Figure 7:
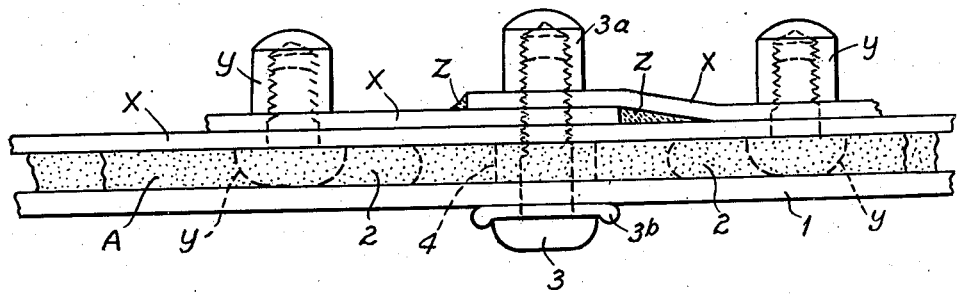
Figure 7 is a vertical sectional view, taken on the line 7—7 of Figure 5.

In Figures 1 to 7, inclusive, of the drawings, I have illustrated my invention applied to a tank provided with a bottom composed of metal plates $x$ having lapped edge portions joined together by bolts or other suitable fastening devices $y$, and made gas and liquid-tight by cement or other suitable sealing compound $z$ applied to the edges of said plates on the top side of the tank bottom. On the underside of said tank bottom there is a series of interconnected troughs located directly beneath the seams or joints in said bottom, as shown in broken lines in Figure 1, and designated by the reference character A. Said troughs are substantially channel-shaped in cross section, and they are secured to the tank bottom with the top edges of the side portions of said troughs sealed to the underside of the tank bottom. One convenient and inexpensive way of building said troughs, is to construct each trough or each trough section, from a horizontally-disposed bottom plate 1, to the top side of which is attached two parallel, spaced strips 2 of compressible or resilient material that constitute the side walls or side portions of the trough, said built-up structure being fastened to the tank bottom by bolts 3 that project upwardly through the bottom plate 1 of the trough, and through a lapped seam of the tank bottom, as shown in Figure 6. The nuts 3a of said bolts are of the cap type, or, in other words, have closed ends, and they are arranged on the top side of the tank bottom. When said nuts are tightened, the bottom plate 1 will be drawn upwardly towards the tank bottom, and the compressible or resilient strips 2 that form the side wall portions of the trough will be deformed from the shape shown in broken lines in Figure 6, to the shape shown in full lines in said figure, thereby sealing the side portions of the trough to the bottom plate 1 and to the underside of the tank bottom. I have found that sponge or synthetic rubber is a suitable material from which to form the strips 2, and preferably, synthetic rubber cement is applied to the top edges of said strips before they are interposed between the plates $x$ of the tank bottom and the bottom plate 1 of the trough. Spacing devices 4, formed preferably by metal washers, are arranged between the tank bottom and the bottom plate 1 of the trough, so as to hold said parts in spaced relation, and the outer ends of the troughs are closed by end dams 2a of compressible or resilient material, located at the peripheral edge of the tank bottom, as shown in Figure 3. Troughs of the construction above described are inexpensive and easy to construct, they will remain in a gas and liquid-tight condition, and they will not freeze and break if filled with water, due to the fact that they have resilient side walls.

The tank is preferably provided with a plurality of inspection stations, or inspection points, located in spaced relation around the peripheral edge of the tank bottom, and formed preferably by short drain pipes 5 provided with shut-off valves 6, as shown in Figures 2 and 3. If, after the tank has been placed in service, enough leaks develop in the tank bottom to make it worth while to collect the substance or material escaping from the tank, a collecting receptacle or receptacles 7 can be connected to one or more of the drain pipes 5, as shown in Figure 2. The tank is also preferably provided with means for enabling a testing medium to be supplied to the troughs and applied to the seams or joints of the tank bottom, for the purpose of testing said joints for leaks or to facilitate the application of a sealing substance to said joints. In the form of my invention herein illustrated, the means just referred to includes an elevated reservoir 8 on the exterior of the tank adapted to hold the testing medium and connected by a vertical pipe 8a with one of the valve-controlled drain pipes 5 of the trough system, as shown in Figure 2, a vent pipe 9 communicating with the highest point of the trough system, and provided with a control valve 9a, and an overflow reservoir 10 at the upper end of the vent pipe 9.

As shown in Figures 1, 2, 3 and 4 of the drawings, the ducts 5 which lead from the troughs to the inspection stations on the exterior of the tank, project downwardly from the bottom of the troughs and extend laterally underneath the side wall of the tank. It will also be noted that in a structure of the kind shown in Figure 2, any liquid that exists in or collects in the trough system will flow by gravity to a point or points on the exterior of the tank, where is can easily be inspected or recovered.

In constructing the tank bottom, the bottom plates 1 of the troughs, with the resilient strips 2 positioned thereon, are laid on the ground beneath the lapped plates x which constitute the bottom of the tank, and thereafter, the lapped plates x are joined together by bolts y, and the trough bolts 3 are inserted in aligned holes in the trough plates 1 and in the lapped portions of the tank bottom plates x, with gaskets 3ᵇ positioned under the heads of said bolts. The nuts 3ᵃ of the bolts 3 are then tightened, so as to seal the top edges of the side wall portions of the troughs to the underside of the tank bottom. After the entire tank bottom is thus laid, cement or other suitable sealing material z is laid along the seams or joints of the tank bottom plates x and around the bottom of the nuts 3ᵃ. Subsequently, the trough system is cut off from the atmosphere, and a vacuum is pulled on the troughs, whereupon the sealing material z is sucked in between the lapped portions of the tank bottom plates where it will set in an hour or so. After the sealing material has set, water pressure can be applied to the seams or joints of the tank bottom by filling the elevated reservoir 8 with water, the vent pipe 9 permitting air to escape from the trough system as the water flows through the troughs A. If there are any leaks in the seams or joints of the tank bottom, they can be easily detected by water escaping upwardly through same onto the top side of the tank bottom.

Instead of using water to test the seams of the tank bottom, air under pressure may be used as the testing medium. In such instances the valve 9ᵃ in the vent pipe 9 is closed and a pressure tank is substituted for the open tank 8 through which water was introduced into the trough system. A reasonable pressure for such a test is 2 lbs. to 3 lbs. per square inch, but the troughs A may be made to withstand any desired pressure, even to the full head of liquid in the tank, in which case it forms a double seal for the tank bottom.

Still another method of testing the tank bottom seams, would be to pull a very high vacuum on the troughs A when they are cut off from the atmosphere. This vacuum would tend to pull the bottom plates 1 of the troughs upwardly towards the tank bottom plates, and hence, would improve the tightness of the seal between the tank bottom and the side wall portions 2 of the troughs. Such a vacuum could be pulled while a sealing compound (for a bolted tank bottom) is applied to the seams of the bottom. The amount of vacuum could be controlled to just pull a semi-liquid sealing cement between the tank bottom plates at the seams, as desired. A good way to make a sure and quick test for leaks in the tank bottom seams, is to flood the tank bottom with a few inches of water, and then apply about 1 lb. per square inch air pressure to the troughs A. By any of the above described methods of testing, leaks in the tank bottom seams can be quickly and reliably detected during the operation of constructing the tank bottom, and accordingly, can be repaired before the tank is put in service.

Figure 8:
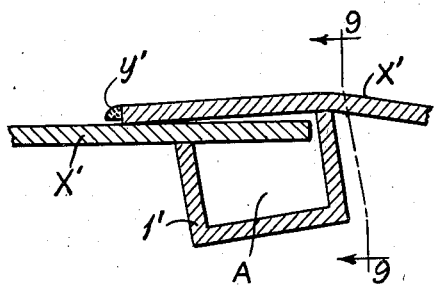
Figure 8 is a sectional view, illustrating my invention employed in a tank bottom composed of lapwelded plates.
Figure 9:
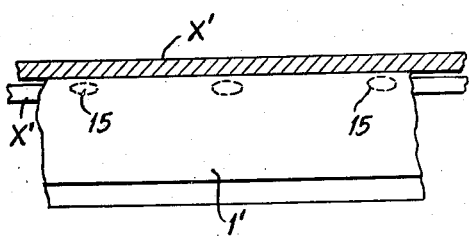
Figure 9 is a sectional view, taken on the line 9—9 of Figure 8, looking in the direction indicated by the arrows.

While I prefer to seal the side portions of the troughs A to the underside of the tank bottom, as above described, such sealing is not absolutely necessary, so far as detecting and recovering leakage is concerned, while the tank is in use. It is highly practicable to construct the troughs A from prefabricated members, such as steel channels 1', properly interconnected with each other and simply laid beneath the tank bottom, due to the fact that the weight of the tank bottom, plus the weight of the liquid confined in the tank, would insure fairly tight joints between the side portions of the troughs and the underside of the tank bottom. Any leakage would drain by gravity through the troughs to the peripheral edge of the tank bottom, where it could be detected or trapped. If the leakage is excessive, the tank could be taken out of service and the leaky joint or joints repaired. In the case of a tank bottom composed of lapped plates x' joined together by welds y', as shown in Figures 8 and 9, no attempt is made to absolutely seal the side walls or side portions of the troughs to the underside of the tank bottom. In such a tank bottom the troughs or trough sections may be formed from pieces of channel iron 1", arranged so that the top edge of one leg of the channel bears against the bottom face of the lower tank bottom plate, and the other leg of the channel projects upwardly along the edge of said lower plate. Before the top plate is laid on the lower plate, the right hand leg of the channel (looking at Figure 8) is secured by tack welds 15 to the edge of said lower plate, as shown in Figure 9. Thereafter, when the top plate is laid or arranged in overlapping relation with the lower plate, said upper plate bears hard against the tacked leg of the channel, because said leg projects slightly above the top surface of the lower plate. This action of the top plate acts as a lever to press the untacked leg of the channel (left hand leg) tightly against the underside of the lower plate, thereby insuring that the channels will be maintained in sufficiently tight engagement with the tank bottom to convey leakage to the inspection or collection point or points at the peripheral edge of the tank bottom. When a tank is first built and is under water test (tanks are practically always filled with water to catch leaks in the side walls), troughs of the kind above described will definitely show whether the tank bottom is lacking, and approximately the location of any leaks.

Prior to my invention it was the general custom to erect a tank bottom on horses about 2½ feet from the ground, and then confine about 6 inches of water on the top side of the bottom, and then crawl underneath the bottom and inspect the seams or joints in same for leaks. Another method employed for leak-testing welded tank bottoms, involved constructing an earthen dam around the outside of the tank, filling the same with water, and then checking the leaks from the inside of the tank. Such a method of testing for leaks, is very unsatisfactory, especially in sandy soil, and in addition, the hydrostatic head obtained, is of the order of 2 or 3 inches which will not show all of the leaks that will occur at high pressure. Still another method of testing for leaks in a tank whose side wall is erected on an annular base of concrete, involved sealing the edge of the tank to the concrete and applying air pressure under the bottom of the tank. This allows only 2 or 3 inches $H_2O$ head, and necessitates soaping all of the seams or joints in the tank bottom, preparatory to looking for leaks. The above described methods of testing for leaks have not proved entirely satisfactory, on account of the liability of distorting the tank bottom plates; on account of the inability of being able to use a relatively high pressure in the testing operation; on account of the necessity of having to construct the tank bottom on elevated supports; and on account of the impossibility of quickly and accurately locating a leak that develops after the tank has been put into service.

My invention effectively overcomes the inherent objections of prior methods employed for detecting leaks in tank bottoms; it eliminates the human equation in testing a tank bottom for leaks; it shows up weak or doubtful seams or joints because of the high pressure employed in the testing operation; it overcomes the necessity of shifting or moving the tank bottom, after it has been fabricated, thereby eliminating the possibility of distorting the tank bottom plates; and it eliminates the possibility of the tank bottom plates being flexed upwardly and distorted during the operation of applying the testing medium to the joints or seams of the tank bottom. In addition to the desirable features just mentioned, my invention makes it possible to discover a leak at any time during the life of the tank, and without the necessity of emptying the tank and going inside of same and inspecting the joints by eye, which is never perfectly reliable. My improved tank bottom can be reliably tested for leaks, even though the tank contains four of five feet of liquid, simply by applying air pressure to the troughs A, whereupon, in case there is a defective seam, bubbles will rise through the liquid in the tank and make a sufficient noise to enable the approximate location of the leak to be determined.

My improved tank bottom is the only one, to my knowledge, that will definitely tell whether there are leaks in same at the time of construction, and also enable a small leak in the bottom to be quickly detected when the tank is in use. With tank bottoms of conventional construction, the only way to discover a bottom leak, is for the leak to saturate the ground and show outside the tank. Moreover, there is no way to collect the leakage and keep the tank in service, in instances where it would cause a great loss or inconvenience to empty the tank. My invention enables a leak to be detected before a large amount of material has leaked out of the tank, and it enables a leaky tank to be kept in service by collecting the leakage from the drain pipes 5.

I have herein illustrated my invention embodied in a tank erected on the surface of the ground and provided with a substantially flat bottom, that slopes either towards the center, or towards the side wall of the tank, but I wish it to be understood that my invention is applicable to tanks that are buried in the ground, and also tanks provided with curved bottoms. In the case of a buried tank, a vertical shaft would be provided for inspection of leaks.

Having thus described my invention, what I claim as new and desire to secure by Letters Patent is:

A tank provided with an upright side wall, a bottom composed of metal plates joined together, interconnected troughs laid on the ground under said bottom in alignment with the seams of the bottom and having side walls that comprise resilient portions which bear against the underside of the bottom, said troughs leading to inspection stations located adjacent the lower end of the tank side wall on the exterior of the tank, and means accessible from the top side of the tank bottom for attaching the troughs to said bottom.

JOHN H. WIGGINS.

REFERENCES CITED

The following references are of record in the file of this patent:

UNITED STATES PATENTS

| Number | Name | Date |
|---|---|---|
| 1,954,581 | Wortmann | Apr. 10, 1934 |
| 1,966,244 | Hansen | July 10, 1934 |
| 2,126,997 | Kramer | Aug. 16, 1938 |

FOREIGN PATENTS

| Number | Country | Date |
|---|---|---|
| 281,485 | Italy | Jan. 14, 1931 |